United States Patent
Mori

(10) Patent No.: US 8,066,570 B2
(45) Date of Patent: Nov. 29, 2011

(54) NETWORK GAME SYSTEM, GAME MACHINE, GAME MACHINE CONTROL METHOD, AND INFORMATION STORAGE MEDIUM

(75) Inventor: Shoji Mori, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 813 days.

(21) Appl. No.: 12/092,638

(22) PCT Filed: Oct. 6, 2006

(86) PCT No.: PCT/JP2006/320065
§ 371 (c)(1),
(2), (4) Date: May 5, 2008

(87) PCT Pub. No.: WO2007/052439
PCT Pub. Date: May 10, 2007

(65) Prior Publication Data
US 2009/0286603 A1    Nov. 19, 2009

(30) Foreign Application Priority Data
Nov. 4, 2005 (JP) ................................. 2005-321618

(51) Int. Cl.
*A63F 9/24* (2006.01)
(52) U.S. Cl. .................. 463/42; 463/40; 463/20; 463/25
(58) Field of Classification Search .................... 463/20, 463/25, 40, 42
See application file for complete search history.

(56) References Cited

U.S. PATENT DOCUMENTS

| 5,685,775 | A | 11/1997 | Bakoglu et al. |
| 5,820,463 | A | 10/1998 | O'Callaghan |
| 2002/0142843 | A1 | 10/2002 | Roelofs |

(Continued)

FOREIGN PATENT DOCUMENTS

EP    1086731 A2    3/2001

(Continued)

OTHER PUBLICATIONS

Extended European Search Report dated Oct. 24, 2008.

(Continued)

*Primary Examiner* — Dmitry Suhol
*Assistant Examiner* — Brandon Gray
(74) *Attorney, Agent, or Firm* — Sughrue Mion, PLLC

(57) ABSTRACT

A network game system is provided in which unfairness between players playing on first and second game machines can be corrected in a network game system in which the first game machine displays a game screen of a content corresponding to an operation executed in the first game machine and makes the second game machine display a game screen of a content corresponding to an operation executed in the second game machine by exchanging data with the second game machine through a communication network. A controlling unit (an operation information acquiring unit (34) and a display controller (36)) controls a length of a time period from a time when an operation is executed in the first game machine (game machine (12a)) to a time when a game screen of a content corresponding to the operation is displayed in the first game machine, based on data exchange time information related to a time period required for exchange of data between the first game machine and the second game machine (game machine (12b)).

8 Claims, 6 Drawing Sheets

U.S. PATENT DOCUMENTS

| | | | |
|---|---|---|---|
| 2002/0147047 A1* | 10/2002 | Letovsky et al. | 463/42 |
| 2002/0165630 A1* | 11/2002 | Arthur et al. | 700/91 |
| 2003/0060285 A1 | 3/2003 | Itakura | |
| 2004/0087321 A1 | 5/2004 | Lin et al. | |
| 2004/0087322 A1 | 5/2004 | Aasgaard | |
| 2004/0087371 A1 | 5/2004 | Yamana et al. | |
| 2004/0087372 A1 | 5/2004 | Yamana et al. | |
| 2008/0300046 A1* | 12/2008 | Gagner et al. | 463/25 |

FOREIGN PATENT DOCUMENTS

| | | |
|---|---|---|
| EP | 1640047 A1 | 3/2006 |
| JP | 2001-198363 A | 7/2001 |
| JP | 2002-085850 A | 3/2002 |
| JP | 2003-062350 A | 3/2003 |
| JP | 2004-350910 A | 12/2004 |
| JP | 2005-094385 A | 4/2005 |
| JP | 2005-267347 A | 9/2005 |
| TW | 575447 A1 | 2/2004 |

OTHER PUBLICATIONS

Taiwanese Search Report for Patent Application No. 095139299 dated Apr. 7, 2009 together w/partial translation.

* cited by examiner

| ID | ACCESS INFORMATION | SERVER-CLIENT STATE FLAG |
|---|---|---|
| 1 | ... | 1 |
| 2 | ... | 0 |
| 3 | ... | 0 |
| 4 | ... | 0 |

FIG.5

| GAME STATUS INFORMATION | ELAPSED TIME COUNTER |
|---|---|
| GAME STATUS INFORMATION 1 | 10 |
| GAME STATUS INFORMATION 2 | 9 |
| GAME STATUS INFORMATION 3 | 8 |
| GAME STATUS INFORMATION 4 | 7 |

FIG.6

| OPERATION INFORMATION | ELAPSED TIME COUNTER |
|---|---|
| OPERATION INFORMATION 1 | 15 |
| OPERATION INFORMATION 2 | 14 |
| OPERATION INFORMATION 3 | 13 |
| OPERATION INFORMATION 4 | 12 |

NETWORK GAME SYSTEM, GAME MACHINE, GAME MACHINE CONTROL METHOD, AND INFORMATION STORAGE MEDIUM

TECHNICAL FIELD

The present invention relates to a network game system, a game machine, a game machine control method, and an information storage medium.

BACKGROUND ART

A network game system is known which comprises a first game machine and a second game machine which are connected to a communication network, and in which the first game machine displays a game screen of a content corresponding to an operation executed in the first game machine and makes the second game machine display a game screen of a content corresponding to an operation executed in the second game machine by exchanging data with the second game machine via the communication network. As such a network game system, for example, a system is known which realizes a match of a soccer game by players of the first and second game machines.
[Patent Document 1] Japanese Patent Laid-Open Publication No. 2004-350910

DISCLOSURE OF THE INVENTION

Problems to be Solved by the Invention

In the above-described network game system, with the data exchange between the first game machine and the second game machine via the communication network, the game screen of a content corresponding to an operation executed in the second game machine is displayed on the second game machine. Because of this, in the second game machine, the response to the game operation is inferior compared to that in the first game machine. Therefore, the player of the second game machine must play the game at a disadvantageous state compared to the player of the first game machine. Thus, in such a network game system, it is strongly desired to correct the unfairness between the player playing on the first game machine and the player playing on the second game machine.

The present invention was conceived in consideration of the above-described circumstances, and an object of the present invention is to provide a network game system, a game machine, a game machine control method, and an information storage medium which allow correction of unfairness between a player playing on a first game machine and a player playing on a second game machine in a network game system comprising the first game machine and the second game machine which are connected to a communication network and in which the first game machine displays a game screen of a content corresponding to an operation executed in the first game machine and makes the second game machine display a game screen of a content corresponding to an operation executed in the second game machine by exchanging data with the second game machine via the communication network.

Means for Solving the Problem

In order to solve at least the problem described above, according to one aspect of the present invention, there is provided a network game system comprising a first game machine and a second game machine which are connected to a communication network and in which the first game machine displays a game screen of a content corresponding to an operation executed in the first game machine and makes the second game machine display a game screen of a content corresponding to an operation executed in the second game machine by exchanging data with the second game machine via the communication network, the network game system comprising data exchange time information acquiring means for acquiring data exchange time information related to a time period required for exchange of data between the first game machine and the second game machine via the communication network, and controlling means for controlling, in the case where an operation is executed in the first game machine, a length of a time period from a time when the operation is executed to a time when a game screen of a content corresponding to the operation is displayed in the first game machine, based on the data exchange time information acquired by the data exchange time information acquiring means.

According to another aspect of the present invention, there is provided a game machine which is included as a first game machine in "a network game system comprising the first game machine and a second game machine which are connected to a communication network and in which the first game machine displays a game screen of a content corresponding to an operation executed in the first game machine and makes the second game machine display a game screen of a content corresponding to an operation executed in the second game machine by exchanging data with the second game machine via the communication network", the game machine comprising data exchange time information acquiring means for acquiring data exchange time information related to a time period required for exchange of data between the game machine and the second game machine via the communication network, and controlling means for controlling, in the case where an operation is executed in the game machine, a length of a time period from a time when the operation is executed to a time when a game screen of a content corresponding to the operation is displayed and output in the game machine, based on the data exchange time information acquired by the data exchange time information acquiring means.

According to another aspect of the present invention, there is provided a method of controlling a game machine which is included as a first game machine in a "network game system comprising the first game machine and a second game machine which are connected to a communication network and in which the first game machine displays a game screen of a content corresponding to an operation executed in the first game machine and makes the second game machine display a game screen of a content corresponding to an operation executed in the second game machine by exchanging data with the second game machine via the communication network", the method comprising a data exchange time information acquiring step in which data exchange time information related to a time period required for exchange of data between the game machine and the second game machine via the communication network is acquired, and a controlling step in which, in the case where an operation is executed in the game machine, a length of a time period from a time when the operation is executed to a time when a game screen of a content corresponding to the operation is displayed and output in the game machine is controlled based on the data exchange time information acquired in the data exchange time information acquiring step.

According to another aspect of the present invention, there is provided a program for causing a computer such as a home game machine, a portable game machine, a commercial game machine, a personal computer, a portable phone, and a personal digital assistant (PDA) to function as a first game machine included in a "network game system comprising the first game machine and a second game machine which are connected to a communication network and in which the first game machine displays a game screen of a content corresponding to an operation executed in the first game machine and makes the second game machine display a game screen of a content corresponding to an operation executed in the second game machine by exchanging data with the second game machine via the communication network", the program causing the computer to function as data exchange time information acquiring means for acquiring data exchange time information related to a time period required for exchange of data between the first game machine and the second game machine via the communication network, and controlling means for controlling, in the case where an operation is executed in the first game machine, a length of a time period from a time when the operation is executed to a time when a game screen of a content corresponding to the operation is displayed in the game machine, based on the data exchange time information acquired by the data exchange time information acquiring means.

According to another aspect of the present invention, there is provided an information storage medium which is a computer readable information storage medium storing the above program. According to another aspect of the present invention, there is provided a program distribution device comprising an information storage medium storing the above program and which reads the above program from the information storage medium and distributes the above program. According to another aspect of the present invention, there is provided a program distribution method, while using an information storage medium storing the above program, for reading the above program from the information storage medium, and distributing the above program.

The present invention relates to a network game system comprising a first game machine and a second game machine which are connected to a communication network and in which the first game machine displays a game screen of a content corresponding to an operation executed in the first game machine and makes the second game machine display a game screen of a content corresponding to an operation executed in the second game machine by exchanging data with the second game machine via the communication network. In various aspects of the present invention, data exchange time information related to a time required for exchange of data between the first game machine and the second game machine via the communication network is acquired. In the case where an operation is executed in the first game machine, a length of a time period from a time when the operation is executed to a time when a game screen of a content corresponding to the operation is displayed and output in the first game machine is controlled based on the acquired data exchange time information. With the present invention, unfairness between a player playing on the first game machine and a player playing on the second game machine can be corrected.

In one example of the present invention, the data exchange time information acquiring means may acquire first data exchange time information related to a time period required for transmission of data from the second game machine to the first game machine and second data exchange time information related to a time period required for transmission of data from the first game machine to the second game machine, and the controlling means may control the length of the time period from the time when the operation is executed in the first game machine to the time when the game screen of the content corresponding to the operation is displayed in the first game machine based on the first data exchange time information and the second data exchange time information. With such a configuration, it is possible to control the length of the time period from the time when the operation is executed in the first game machine to the time when the game screen of the content corresponding to the operation is displayed in the first game machine considering the time required for transmission of data from the second game machine to the first game machine and the time required for transmission of data from the first game machine to the second game machine.

In another example of the present invention, the first game machine may comprise means for transmitting first response request data to the second game machine, and means for transmitting second response request data to the second game machine, the second game machine may comprise means for transmitting, in the case of reception of the first response request data, first response data having a data size which differs from that of the first response request data to the first game machine, and means for transmitting, in the case of reception of the second response request data, second response data to the first game machine, the first game machine may comprise measurement means for measuring a time period from a time when the first response request data is transmitted to a time when the first response data is received and a time period from a time when the second response request data is transmitted to a time when the second response data is received, and the data exchange time information acquiring means may acquire the first data exchange time information and the second data exchange time information based on a measurement result by the measurement means. The second response request data and the second response data are, for example, data with a ratio of data size between the second response request data and the second response data differing from a ratio of data size between the first response request data and the first response data. For example, the second response request data may be data having a data size which is identical to that of the first response data and the second response data may be data having a data size which is identical to that of the first response request data. With such a configuration, even when at least one of the first and second game machines is connected to the communication network through an asymmetric communication method having uplink and downlink communication speeds which differ from each other such as an ADSL communication method, information related to the time required for transmission of data from the second game machine to the first game machine and information related to the time required for transmission of data from the first game machine to the second game machine can be acquired. As a result, even when at least one of the first and second game machines is connected to the communication network through an asymmetric communication method having different uplink and downlink communication speeds, the length of the time period from a time when an operation is executed in the first game machine to a time when a game screen of a content corresponding to the operation is displayed in the first game machine can be controlled in consideration of the time required for transmission of data from the second game machine to the first game machine and the time required for transmission of data from the first game machine to the second game machine.

In another example of the present invention, the second game machine may comprise means for transmitting first response request data to the first game machine, and means for transmitting second response request data to the first game machine, the first game machine may comprise means for transmitting, in the case of reception of the first response request data, first response data having a data size which differs from that of the first response request data to the second game machine, and means for transmitting, in the case of reception of the second response request data, second response data to the second game machine, the second game machine may comprise measurement means for measuring a time period from a time when the first response request data is transmitted to a time when the first response data is received and a time period from a time when the second response request data is transmitted to a time when the second response data is received, and the data exchange time information acquiring means may acquire the first data exchange time information and the second data exchange time information based on a measurement result by the measurement means. Here, the second response request data and the second response data are data with a ratio of data size between the second response request data and the second response data differing from a ratio of data size between the first response request data and the first response data. For example, the second response request data may be data having a data size which is identical to that of the first response data and the second response data may be data having a data size which is identical to that of the first response request data. With this configuration also, for example, even when at least one of the first and second game machines is connected to the communication network through an asymmetric communication method having different uplink and downlink communication speeds, such as the ADSL communication method, information related to the time required for transmission of data from the second game machine to the first game machine and information related to the time required for transmission of data from the first game machine to the second game machine can be acquired. As a result, even when at least one of the first and second game machines is connected to the communication network through an asymmetric communication method having different uplink and downlink communication speeds, a length of a time period from a time when an operation is executed in the first game machine to a time when a game screen of a content corresponding to the operation is displayed in the first game machine can be controlled in consideration of the time required for transmission of data from the second game machine to the first game machine and the time required for transmission of data from the first game machine to the second game machine.

In another example of the present invention, a ratio of data size between the first response request data and the first response data may differ from a ratio of data size between the second response request data and the second response data.

In another example of the present invention, the second game machine may comprise second game status information storage means for storing second game status information indicating a game status, and operation information transmitting means for transmitting, to the first game machine, operation information corresponding to an operation content executed in the second game machine, the first game machine may comprise operation information receiving means for receiving the operation information transmitted from the second game machine, first game status information generation means for generating first game status information indicating a most-recent game status based on an operation content executed in the first game machine and the operation information transmitted from the second game machine, game status update information transmitting means for transmitting, to the second game machine, game status updating information for updating the second game status information stored in the second game status information storage means to the first game status information generated by the first game status information generation means, and first display controlling means for causing the game screen to be displayed based on the first game status information generated by the first game status information generation means, the second game machine may comprise game status update information receiving means for receiving the game status updating information transmitted from the first game machine, second game status information updating means for updating the second game status information stored in the second game status information storage means based on the game status updating information transmitted from the first game machine, and second display controlling means for causing the game screen to be displayed based on the second game status information stored in the second game status information storage means, the data exchange time information acquiring means may acquire the first data exchange time information related to a time period required for transmission of the operation information from the second game machine to the first game machine and the second data exchange time information related to a time period required for transmission of the game status updating information from the first game machine to the second game machine, and the controlling means may comprise first controlling means for controlling, based on the first data exchange time information, the length of the time period from a time when the operation is executed in the first game machine to a time when the first game status information based on the operation content is generated by the first game status information generation means, and second controlling means for controlling, based on the second data exchange time information, the length of the time period from a time when the first game status information is generated by the first game status information generation means to a time when the game screen based on the first game status information is displayed by the first display controlling means.

In this example of the present invention, operation information corresponding to the operation content in the second game machine is transmitted from the second game machine to the first game machine. Information indicating the most-recent game status is generated in the first game machine based on the operation content of the first game machine and the operation information transmitted from the second game machine. Information for allowing storage of the information indicating the most-recent game status in the second game machine is transmitted from the first game machine to the second game machine. In this manner, in this example of the present invention, a game screen of a content corresponding to the operations executed in the first and second game machines is displayed on the first and second game machines. In order to display, in the first and second game machines, the game screen of the content corresponding to the operations in the first and second game machines, a process may be considered in which (a) the first game machine transmits, to the second game machine, operation information corresponding to the operation content in the first game machine, (b) the second game machine transmits, to the first game machine, operation information corresponding to the operation content in the second game machine, and (c) each of the first and second game machines generates information indicating the most-recent game status based on the operation contents in the first and second game machines and displays the game screen based on the generated information. However, when such a configuration is employed, a difference may occur between the most-recent game status managed by the first game machine and the most-recent game status managed by the second game machine, resulting in an inconsistency in the game. In this regard, in this example of the present invention, because the most-recent game status is centrally managed by the first game machine, the possibility of occurrence of the disadvantage as described above can be reduced.

According to this example of the present invention, it is possible to set the time period from the time when the operation is executed in the first game machine to the time when the game screen of the content corresponding to the operation is displayed in the first game machine and the time period from the time when the operation is executed in the second game machine to the time when the game screen of the content corresponding to the operation is displayed in the second game machine to approximately identical period. In addition, according to this example of the present invention, it is possible to configure such that after the operation is executed in the first game machine, the game screen of the content corresponding to the operation can be displayed in the first game machine and in the second game machine at approximately the same time. Because of this, in this example of the present invention, it is possible to correct unfairness between the player playing on the first game machine and the player playing on the second game machine.

With the above-described configurations, according to this example of the present invention, it is possible to display, in the first and second game machines, game screens of contents corresponding to the operations in the first and second game machines while reducing the occurrences of the above-described disadvantages, and at the same time, it is possible to correct the unfairness between the player playing on the first game machine and the player playing on the second game machine.

BRIEF DESCRIPTION OF THE DRAWINGS

FIG. 5 is a diagram showing an example of a game status information table.

FIG. 6 is a diagram showing an example of an operation information table.

BEST MODE FOR CARRYING OUT THE INVENTION

One example of an embodiment of the present invention will now be described in detail with reference to the drawings.

Figure 1:
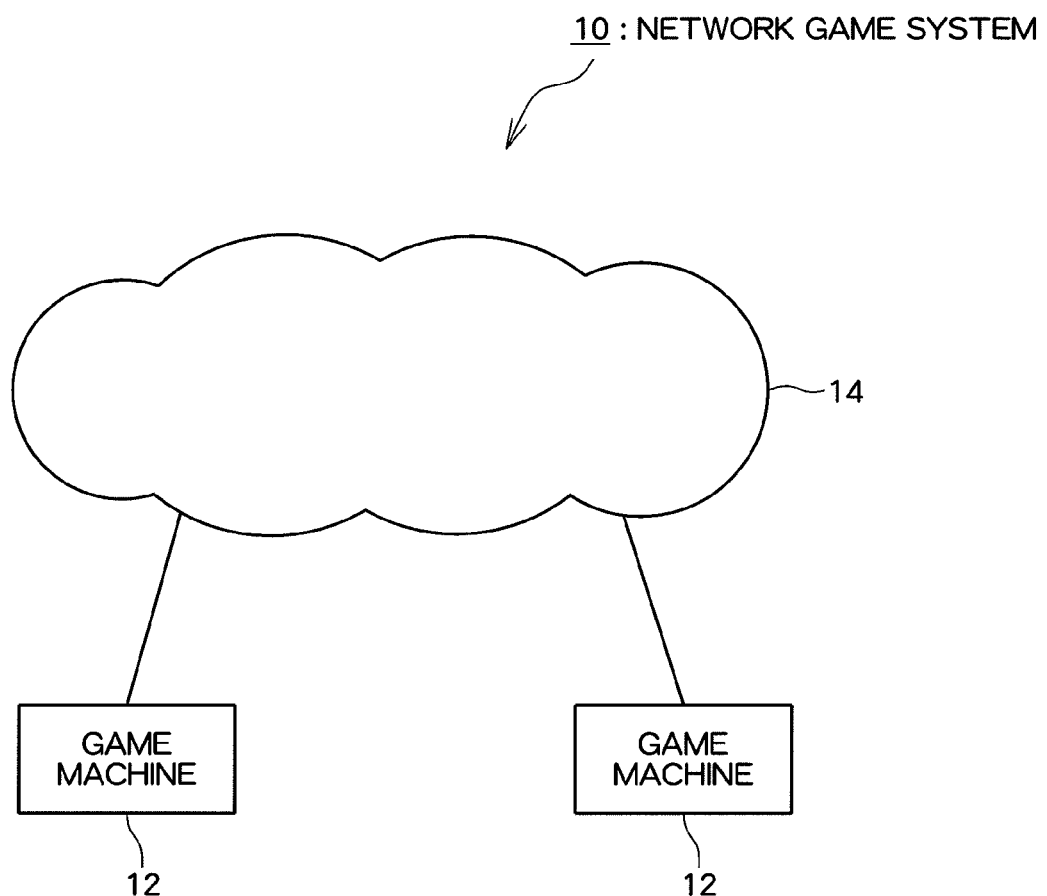
FIG. 1 is a diagram showing an overall structure of a network game system according to an embodiment of the present invention.

FIG. 1 is a diagram showing an overall structure of a network game system according to the embodiment of the present invention. As shown in FIG. 1, a network game system 10 comprises a plurality of game machines 12. The game machines 12 are connected to a communication network 14 such as the Internet and can mutually exchange data.

The game machine 12 is a computer system comprising, for example, a microprocessor, a main memory, a hard disk storage device, a disk reading device, a communication interface, a timer unit, an operation unit, an image processing unit, a monitor, etc. The operation unit is, for example, a game controller or a mouse. The disk reading device is, for example, a reading device which reads stored content of an optical disk (information storage medium) such as a DVD-ROM. The communication interface is an interface for connecting the game machine 12 to the communication network 14. The image processing unit comprises a VRAM, and draws a game screen on the VRAM based on image data sent from the microprocessor. The image processing unit converts the data into a video signal and outputs to the monitor at a predetermined timing. The game machine 12 is constructed with, for example, a home game machine, a portable game machine, a personal digital assistant, a portable phone, or a personal computer, all of which are known in the related art.

In the network game system 10 having the above-described structure, a common game status (game status information) is maintained in main memories of the game machines 12. The common game status is updated based on the operation content executed in the game machines 12. In addition, a game screen representing the common game status is displayed on the monitors of the game machines 12. In this manner, in the network game system 10, a network game is realized in which a plurality of players simultaneously participate via the communication network 14.

In the network game system 10, a server function and a client function are provided in each of the game machines 12. The server function is a function to set the game statuses maintained in each of the game machines 12 to be common. The server function may include, for example, (a) a function to manage base game status information (primary game status information), (b) a function to update the primary game status information based on operation contents executed in the game machines 12, and (c) a function to reflect the update content to game status information (secondary game status information) maintained in other game machines 12 so that, as a result, the update content is reflected on the game screen of the other game machines 12. The client function may include, for example, (a) a function to supply an operation content of a player to the server function, and (b) a function to update the game screen based on the game status updated by the server function.

In the network game system 10, the game machines 12 are operated as clients and at least one game machine 12 is operated as a server to realize the network game. In other words, in the network game system 10, the network game is realized with exchange of various information (for example, operation information and update information of game status) between the server function of the at least one game machine 12 and the client functions of the game machines 12.

Here, a state of the game machine 12 operating as a server and a client is described as a server-client state and a game machine 12 in the server-client state (first game machine) is described as a server-client machine. In addition, a state of a game machine 12 operating as a client and not operating as a server is described as client-dedicated state and a game machine 12 in the client-dedicated state (second game machine) is described as a client-dedicated machine.

In the client-dedicated machine in the network game system 10, because a game is executed while the data is exchanged with the server-client machine via the communication network 14, the response to the game operation is inferior compared to the server-client machine. As a result, a player on the client-dedicated machine must play the game in a disadvantageous state compared to a player on the server-client machine. A technique for correcting unfairness between the player playing on the server-client machine and the player playing on the client-dedicated machine will now be described.

In the following description, an example configuration is described in which a competition soccer game between players of two game machines 12 is provided by the network game system 10. A common game space is constructed in the main memories of the game machines 12, in which soccer player characters of both teams, a soccer ball character, etc. are placed. A game screen representing a scene of the common game space is displayed on the monitor of each game machine 12.

In the network game system 10, before the game is started, a process to determine one of the game machines 12 to be a server-client machine (server-client machine determination process) is executed. In the present embodiment, during the execution of the server-client machine determination process prior to the start of the game, one of the game machines 12 is provisionally selected as a server-client machine.

Figures 2, 3:
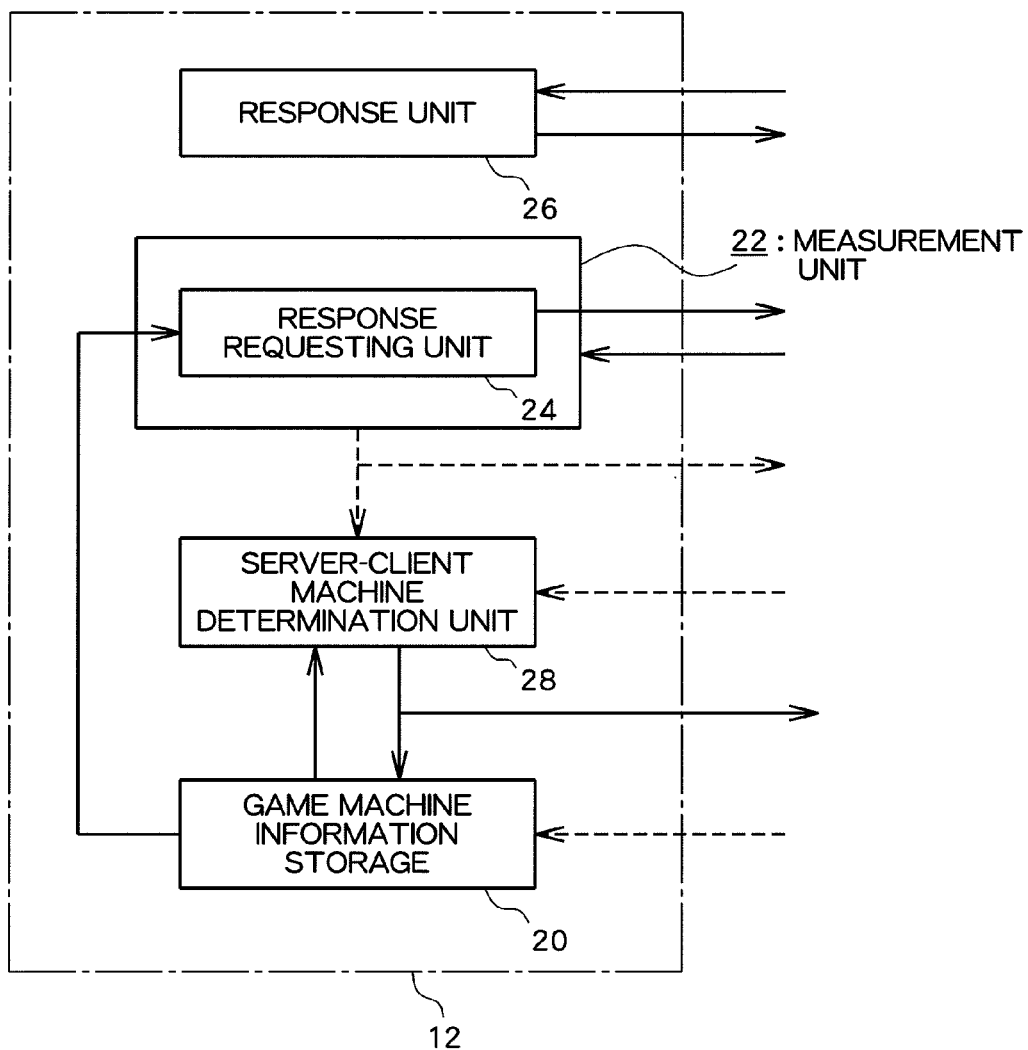
FIG. 2 is a functional block diagram of a game machine included in a network game system according to the embodiment of the present invention.
FIG. 3 is a diagram showing an example of a game machine information table.

FIG. 2 is a functional block diagram showing functions, among the functions realized in each game machine 12, related to execution of the server-client machine determination process. As shown in FIG. 2, each game machine 12 comprises a game machine information storage 20, a measurement unit 22, a response unit 26, and a server-client machine determination unit 28. These functions are realized by a game program, supplied via an information storage medium such as a DVD-ROM or via the communication network 14 such as the Internet, being executed by the game machine 12.

[Game Machine Information Storage]

The game machine information storage 20 is realized primarily with the main memory of the game machine 12. The game machine information storage 20 stores information related to the game machines 12 (game machine information). In the present embodiment, the game machine information storage 20 stores a game machine information table, for example, as shown in FIG. 3. As shown in FIG. 3, the game machine information table includes an "ID" field, an "access information" field, and a "server-client state flag" field. The "ID" field stores identification information (ID) for uniquely identifying a game machine 12. The "access information" field stores access information (for example, IP address) for enabling access to the game machine 12. The content of the "access information" field is referred when, for example, a response requesting unit 24 transmits response request data, the response unit 26 returns response data, and when operation information and game status updating information are transmitted. The "server-client state flag" field stores information indicating whether or not the game machine 12 is in the server-client state (server-client state flag). The server-client state flag takes a value of 0 or 1. When the game machine 12 is not in the server-client state (that is, when the game machine 12 is in the client-dedicated state), the server-client state flag is 0, and, when the game machine 12 is in the server-client state, the server-client state flag is 1.

[Measurement Unit and Response Unit]

The measurement unit 22 is realized primarily with the microprocessor, the main memory, the communication interface, and the timer unit of the game machine 12. The measurement unit 22 includes the response requesting unit 24. The response requesting unit 24 transmits response request data to other game machines 12. The response request data includes transmission time information indicating a transmission time.

The response unit 26 is realized primarily with the microprocessor and the communication interface of the game machine 12. The response unit 26 receives response request data transmitted by the response requesting unit 24 of another game machine 12. Upon receipt of the response request data, the response unit 26 acquires the transmission time information from the response request data. The response unit 26 generates response data including the transmission time information and returns the response data to the game machine 12 transmitting the response request data.

In the present embodiment, the response requesting unit 24 transmits first response request data to the other game machine 12. The first response request data is data including the transmission time information and having a data size of M1 (for example, 1 Kbyte). In this case, the first response request data is received by the response unit 26 of the other game machine 12, and first response data is returned. The first response data is data including the transmission time information which is included in the first response request data and having a data size of M2 (for example, 256 bytes). The measurement unit 22 receives the first response data returned from the response unit 26 of the other game machine 12. The measurement unit 22 then calculates a time T1 required for exchange of the first response request data and the first response data based on the transmission time indicated by the transmission time information included in the first response data and the current time.

Next, the response requesting unit 24 transmits second response request data to the other game machine 12. The second response request data is data including transmission time information and having a data size of M2. In this case, the second response request data is received by the response unit 26 of the other game machine 12, and second response data is returned. Here, the second response data is data including the transmission time information included in the second response request data and having a data size of M1. The measurement unit 22 receives the second response data returned from the response unit 26 of the other game machine 12. The measurement unit 22 then calculates a time T2 required for exchange of the second response request data and the second response data based on the transmission time indicated by the transmission time information included in the second response data and the current time.

In the present embodiment, the measurements of T1 and T2 as described above are executed in each game machine 12 regardless of whether or not the game machine 12 is a game machine 12 provisionally selected as a server-client machine. In this case, after response request data is transmitted by a game machine 12, until the game machine 12 receives response data, transmission of the response request data in another game machine 12 is limited. In other words, the system is controlled such that the measurements of T1 and T2 in each game machine 12 are not simultaneously executed. In the configuration of the present embodiment in which the game is executed between two game machines 12, if there is no difference in processing capability or the like between the two game machines 12, the value of T1 calculated in one of the game machines 12 may be considered to be approximately equal to the value of T2 of the other game machine 12, and, thus, the measurements of T1 and T2 may be executed only on one of the game machines 12 (for example, the game machine 12 which is provisionally selected as the server-client machine).

The measurement unit 22 of each game machine 12 maintains the calculated values of T1 and T2. In addition, the values of T1 and T2 calculated by the measurement units 22 of the game machines 12 are supplied along with the ID of the game machine 12 to the server-client machine determination unit 28 of the game machine 12 provisionally selected as the server-client machine.

[Server-client Machine Determination Unit]

The server-client machine determination unit 28 is realized primarily with the microprocessor and the communication interface. The server-client machine determination unit 28 determines a game machine 12 to be operated as the server-client machine based on the values of T1 and T2 supplied from the measurement units 22 of the game machines 12. As described above, T1 and T2 are supplied from the measurement units 22 of the game machines 12 to the server-client machine determination unit 28 only when the game machine 12 is in the server-client state. Because of this, the server-client machine determination unit 28 operates only when the game machine 12 is in the server-client state.

In the case of acquisition of the values of T1 and T2 supplied from the measurement units 22 of the game machines 12, the server-client machine determination unit 28 solves the following system of simultaneous equations (1) and (2) to calculate the communication speed Vu in the case where the game machine 12 transmits data to another game machine 12 (communication speed in uplink direction) and a communication speed Vd in the case where the other game machine 12 transmits data to the game machine 12 (communication speed in downlink direction). The server-client machine determination unit 28 maintains the calculated values of Vu and Vd in correspondence to the ID supplied along with T1 and T2 forming the basis for the calculation. In the present specification, "*" represents a multiplication operator.

$$(M1*Vu)+(M2*Vd)=T1 \quad (1)$$

$$(M2*Vu)+(M1*Vd)=T2 \quad (2)$$

The server-client machine determination unit 28 selects, for example, a game machine 12 with a large value of Vu as a server-client machine. Alternatively, the server-client machine determination unit 28 may select a game machine 12 having a smallest difference between the values of Vu and Vd as the server-client machine. As will be described later, in the network game system 10, data having a relatively large size (game status updating information to be described later) is transmitted from the server-client machine to the client-dedicated machine during the game. Because of this, if a game machine 12 having a slower uplink communication speed Vu compared to the downlink communication speed Vd such as a game machine 12 connected to the communication network 14 through the ADSL communication method, for example, is set as the server-client machine, there is a possibility that the data cannot be smoothly transmitted from the server-client machine to the client-dedicated machine. In this regard, in the present embodiment, because the server-client machine is selected in the manner described above, for example, a game machine 12 connected to the communication network 14 through an optical communication method is selected as the server-client machine with higher priority than a game machine 12 connected to the communication network 14 through the ADSL communication method, for example. As a result, in the present embodiment, data can be smoothly transmitted from the server-client machine to the client-dedicated machine during the game.

In the case of determining the server-client machine, the server-client machine determination unit 28 updates the game machine information table stored in the game machine information storage 20 of each game machine 12. More specifically, the server-client machine determination unit 28 updates, in the game machine information table stored in the game machine information storage 20 of the game machine 12, a value of the "server-client state flag" field corresponding to the game machine 12 determined as the server-client machine to 1 and values of the "server-client state flag" corresponding to the other game machines to 0. In addition, the server-client machine determination unit 28 transmits, for example, the ID of the game machine 12 determined as the server-client machine to the other game machines 12, to cause the game machine information tables stored in the game machine information storages 20 of the other game machines 12 to be updated in a similar manner.

In the present embodiment, in the case where the server-client machine is determined, execution of the game process for providing a competition soccer game is started.

Figure 4:
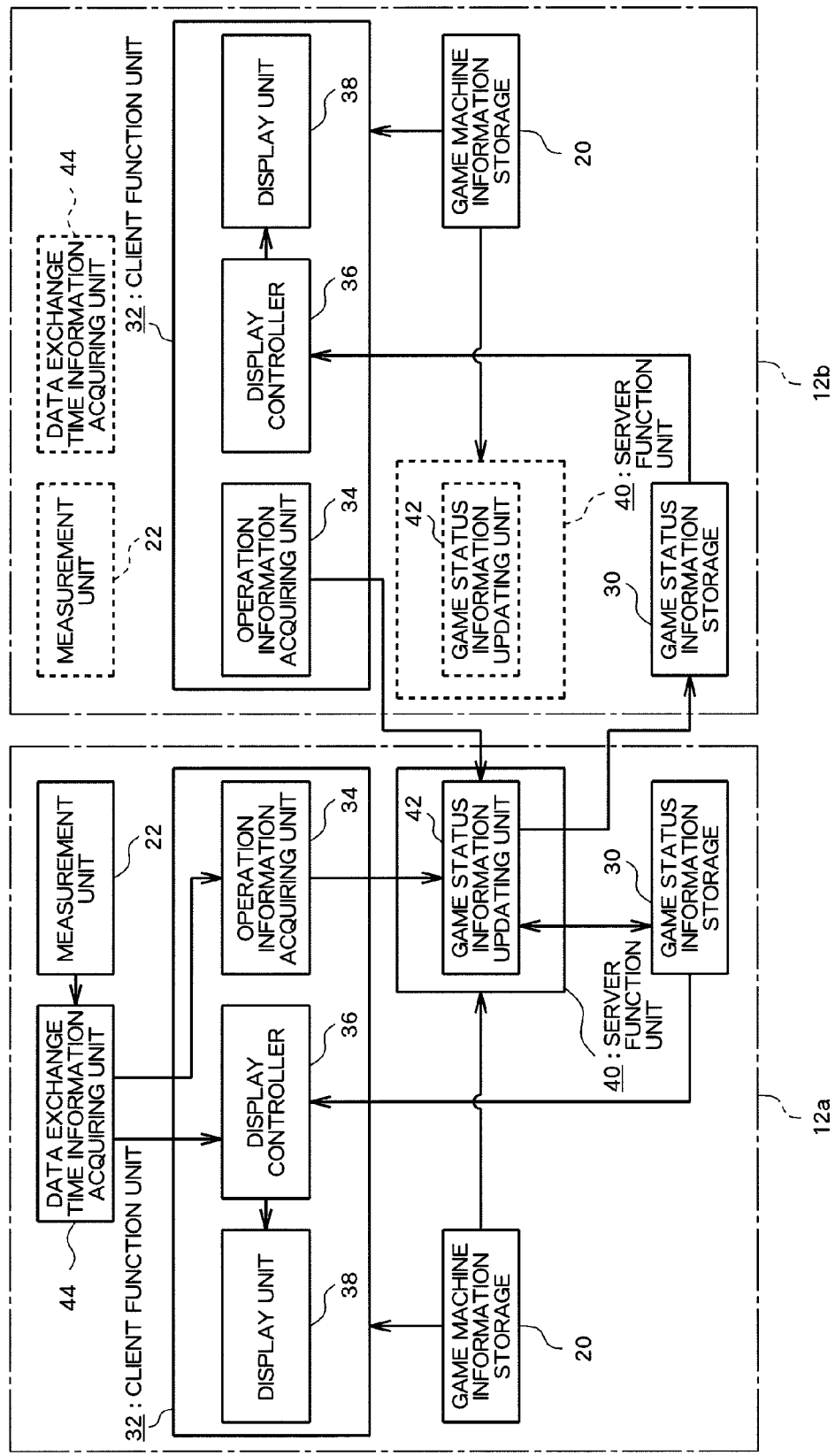
FIG. 4 is a functional block diagram of a game machine included in a network game system according to the embodiment of the present invention.

FIG. 4 is a functional block diagram showing functions, among the functions realized in the game machine 12, related to execution of the game process. As shown in FIG. 4, each of the game machines 12 (game machines 12a and 12b) includes the game machine information storage 20, the measurement unit 22, a game status information storage 30, a client function unit 32, a server function unit 40, and a data exchange time information acquiring unit 44. These functions are realized by a game program, which is supplied via an information storage medium such as a DVD-ROM or via the communication network 14 such as the Internet, being executed by the game machine 12. FIG. 4 shows a relationship between the functional blocks when the game machine 12a is selected as the server-client machine (that is, a case where the game machine 12a is a server-client machine and the game machine 12b is a client-dedicated machine).

[Data Exchange Time Information Acquiring Unit]

The data exchange time information acquiring unit 44 is realized primarily with the microprocessor and the main memory of the game machine 12, and is operated only when the game machine 12 is a server-client machine. The data exchange time information acquiring unit 44 acquires data exchange time information related to a time period required for exchange of data with the client-dedicated machine via the communication network 14. Here, the data exchange time information is information indicating estimated time period required for exchange of data with the client-dedicated machine via the communication network 14, for example. The data exchange time information may alternatively be information for estimating the time period required for exchange of data with the client-dedicated machine via the communication network 14.

The data exchange time information acquiring unit 44 acquires values of T1 and T2 maintained in the measurement unit 22. The data exchange time information acquiring unit 44 then calculates a communication speed Vu in the case where the game machine 12 transmits data to the other game machine 12 and a communication speed Vd in the case where the other game machine 12 transmits data to the game machine 12 by solving the above-described system of simultaneous equations (1) and (2) and maintains the communication speeds.

The data exchange time information acquiring unit 44 calculates an estimated time $\Delta Td$ ($\Delta Td=Md/Vd$) required for transmission of data from the client-dedicated machine to the server-client machine during the game based on the calculated value of Vd and an average data size Md of the data (operation information to be described later) transmitted from the client-dedicated machine to the server-client machine during the game. The data exchange time information acquiring unit 44 maintains the estimated time $\Delta Td$ as a first waiting time $\Delta Tw1$ (first data exchange time information). The value of Md is determined in advance.

The data exchange time information acquiring unit 44 calculates estimated time $\Delta Tu$ ($\Delta Tu=Mu/Vu$) required for transmission of data from the server-client machine to the client-dedicated machine during the game based on the calculated value of Vu and an average data size Mu of the data (game status updating information to be described later) transmitted from the server-client machine to the client-dedicated machine during the game. The data exchange time information acquiring unit 44 maintains the estimated time $\Delta Tu$ as a second waiting time $\Delta Tw2$ (second data exchange time information). The value of Mu is determined in advance.

[Game Status Information Storage]

The game status information storage 30 is realized primarily with the main memory of the game machine 12. The game status information storage 30 stores game status information indicating a status of the game. In the present embodiment, the game status information is information indicating, for example, a state (position, pose, movement direction, movement speed, and operation type such as, for example, dribble, pass, and shoot) of each soccer player character placed in the game space and a state (position, movement direction, movement speed, etc.) of a ball character. The game status information may be information indicating status of a match such as the points of both teams and elapsed time in the match.

In the game status information storage 30 (first game status information storage) of the server-client machine, game status information at each time in a period between the current time and a predetermined time period earlier is stored. In other words, a history of game status information is stored in the game status information storage 30 of the server-client machine. In the present embodiment, a game status information table as shown in FIG. 5, for example, is stored in the game status information storage 30 of the server-client machine. As shown in FIG. 5, the game status information table includes a "game status information" field and an "elapsed time counter" field. The "game status information" field stores game status information. The "elapsed time counter" field stores a numerical value indicating the elapsed time from the time when the game status information is generated, in a predetermined time unit (units of $1/60^{th}$ of a second in the present embodiment) (refer to S102 and S109 of FIG. 7).

On the other hand, only the most-recent game status information is stored in the game status information storage 30 of the client-dedicated machine (second game status information storage).

[Client Function Unit]

The client function unit 32 realizes the client function of the game machine 12. The client function unit 32 includes an operation information acquiring unit 34, a display controller 36, and a display unit 38.

[Operation Information Acquiring Unit]

The operation information acquiring unit 34 is realized including an operation unit of the game machine 12. The operation information acquiring unit 34 acquires operation information corresponding to an operation content of a player based on an operation signal which is input from the operation unit. In other words, the operation information acquiring unit 34 of the server-client machine acquires operation information corresponding to an operation content executed in the server-client machine. The operation information acquiring unit 34 of the client-dedicated machine acquires operation information corresponding to the operation content executed in the client-dedicated machine. The operation information acquired by the operation information acquiring unit 34 is supplied to the game status information updating unit 42 of the server-client machine. In other words, when the game machine 12 is a server-client machine, the operation information acquired by the operation information acquiring unit 34 is supplied to the game status information updating unit 42 of that game machine 12. When, on the other hand, the game machine 12 is the client-dedicated machine, the operation information acquired by the operation information acquiring unit 34 is supplied to the game status information updating unit 42 of the other game machine 12 (server-client machine) via the communication network 14.

The operation information is, for example, information which indicates an operation content of a player determined based on an operation signal which is input from the operation unit. Alternatively, the operation information may be information indicating the operation signal itself which is input from the operation unit. Alternatively, the operation information may be information indicating an operation instruction content for a soccer player character to be operated. The operation instruction content is, for example, dribble, pass, or shoot, and is determined based on an operation signal which is input from the operation unit. As will be described later, the operation information forms a basis for updating the game status information stored in the game status information storage 30.

The operation information acquiring unit 34 of the server-client machine maintains operation information acquired at each time during a period between the current time and a predetermined time earlier. In other words, the operation information acquiring unit 34 of the server-client machine stores a history of operation information. In the present embodiment, the operation information acquiring unit 34 of the server-client machine stores, for example, an operation information table shown in FIG. 6. As shown in FIG. 6, the operation information table includes an "operation information" field and an "elapsed time counter" field. The "operation information" field stores operation information. The "elapsed time counter" stores a numerical value indicating the elapsed time from the time the operation information is acquired, in a predetermined time unit (units of $1/60^{th}$ of a second in the present embodiment) (refer to S102 and S104 of FIG. 7).

The operation information acquiring unit 34 (first controlling means) of the server-client machine reads the first waiting time $\Delta Tw1$ maintained in the data exchange time information acquiring unit 44. In the case where the elapsed time corresponding to the operation information reaches the first waiting time $\Delta Tw1$, the operation information acquiring unit 34 of the server-client machine supplies the operation information to the game status information updating unit 42. In other words, the operation information maintained in the operation information acquiring unit 34 is supplied to the game status information updating unit 42 at a time after the first waiting time $\Delta Tw1$ is elapsed from the time when the operation information is acquired. As will be described later, the game status information updating unit 42 generates most-recent game status information (first game status information) based on the operation information supplied from the operation information acquiring unit 34 of the server-client machine. Therefore, it can be considered that the operation information acquiring unit 34 (first controlling means) of the server-client machine controls, based on the first waiting time $\Delta Tw1$, a length of a time period from the time when an operation is executed in the server-client machine to the time when the most-recent game status information is generated based on the operation content. In other words, the operation information acquiring unit 34 (first controlling means) of the server-client machine awaits the generation of the most-recent game information based on the operation content in the case where an operation is executed in the server-client machine, based on the first waiting time ΔTw1.

The operation information acquiring unit 34 (operation information transmitting means) of the client-dedicated machine, on the other hand, supplies the acquired operation information immediately to the game status information updating unit 42 of the server-client machine via the communication network 14.

[Display Controlling Unit and Display Unit]

The display controller 36 is realized primarily with the microprocessor, the main memory, and the image processing unit of the game machine 12. The display unit 38 is realized primarily with the monitor of the game machine 12. The display controller 36 generates a game screen based on a stored content of the game status information storage 30 and causes the game screen to be displayed on the display unit 38.

The display controller 36 (second controlling means) of the server-client machine reads the second waiting time ΔTw2 maintained in the data exchange time information acquiring unit 44. In the case where the elapsed time corresponding to the game status information reaches the second waiting time ΔTw2, the display controller 36 of the server-client machine reads that game status information from the game status information storage 30. In the case where the display controller 36 of the server-client machine reads the game status information from the game status information storage 30, the display controller 36 (first display controlling means) of the server-client machine generates a game screen based on the game status information and causes the game screen to be displayed on the display unit 38 of the server-client machine. In other words, the display controller 36 of the server-client machine generates a game screen based on the game status data at a time after the second waiting time ΔTw2 has elapsed from the time when the game status data is generated by the game status information updating unit 42 (that is, after the game status data is stored in the game status information storage 30), and causes the game screen to be displayed on the display unit 38 of the server-client machine. Because the display controller 36 of the server-client machine causes the game screen to be displayed on the display unit 38 of the server-client machine in a manner as described above, it can be considered that the display controller 36 (second controlling means) of the server-client machine controls, based on the second waiting time ΔTw2, a length of a time period from the time when the game status information updating unit 42 to be described later generates the most-recent game status information to the time when the game screen based on the game status information is displayed in the server-client machine. In other words, in the case where the game status information updating unit 42 to be described later generates the most-recent game status information, the display controller 36 (second controlling means) of the server-client machine awaits, based on the second waiting time ΔTw2, display of the game screen based on the game status information in the server-client machine.

Because only the most-recent game status information is stored in the game status information storage 30 of the client-dedicated machine, the display controller 36 (second display controlling means) of the client-dedicated machine generates a game screen based on the game status information and causes the game screen to be displayed on the display unit 38 of the client-dedicated machine.

[Server Function Unit]

The server function unit 40 realizes the server function of the game machine 12. The operation of the server function unit 40 is permitted in the server-client machine and is inhibited in the client-dedicated machine. In the case shown in FIG. 4, the server function unit 40 of the game machine 12b is inhibited. The server function unit 40 includes the game status information updating unit 42.

[Game Status Information Updating Unit]

The game status information updating unit 42 is realized primarily with the microprocessor and the communication interface of the game machine 12. The game status information updating unit 42 updates a stored content of the game status information storage 30 of the server-client machine and the client-dedicated machine based on the operation information supplied from the operation information acquiring units 34 of the game machines 12 (server-client machine and client-dedicated machine).

The game status information updating unit 42 (operation information receiving means) receives operation information transmitted from the operation information acquiring unit 34 of the client-dedicated machine. The game status information updating unit 42 (first game status information generation means) reads, as previous game status information, the most-recent game status information among the game status information stored in the game status information storage 30 of the server-client machine. Then, the game status information updating unit 42 generates the most-recent game status information (first game status information) based on the read previous game status information and the operation information supplied from the operation information acquiring units 34 of the server-client machine and the client-dedicated machine. The game status information updating unit 42 then adds and stores the most-recent game status information in the game status information table stored in the game status information storage 30 of the server-client machine. The game status information updating unit 42 (game status update information transmitting means) transmits, to the client-dedicated machine, information indicating a difference between the most-recent game status information and the previous game status information, that is, the game status updating information indicating the updating content of the game status. In this case, the client-dedicated machine (game status update information receiving means) receives the game status updating information transmitted from the server-client machine. The client-dedicated machine (second game status information updating means) then updates the game status information stored in the game status information storage 30 based on the game status updating information transmitted from the server-client machine. Alternatively, as the game status updating information, the newly generated, most-recent game status information itself may be transmitted from the server-client machine to the client-dedicated machine.

Figure 7:
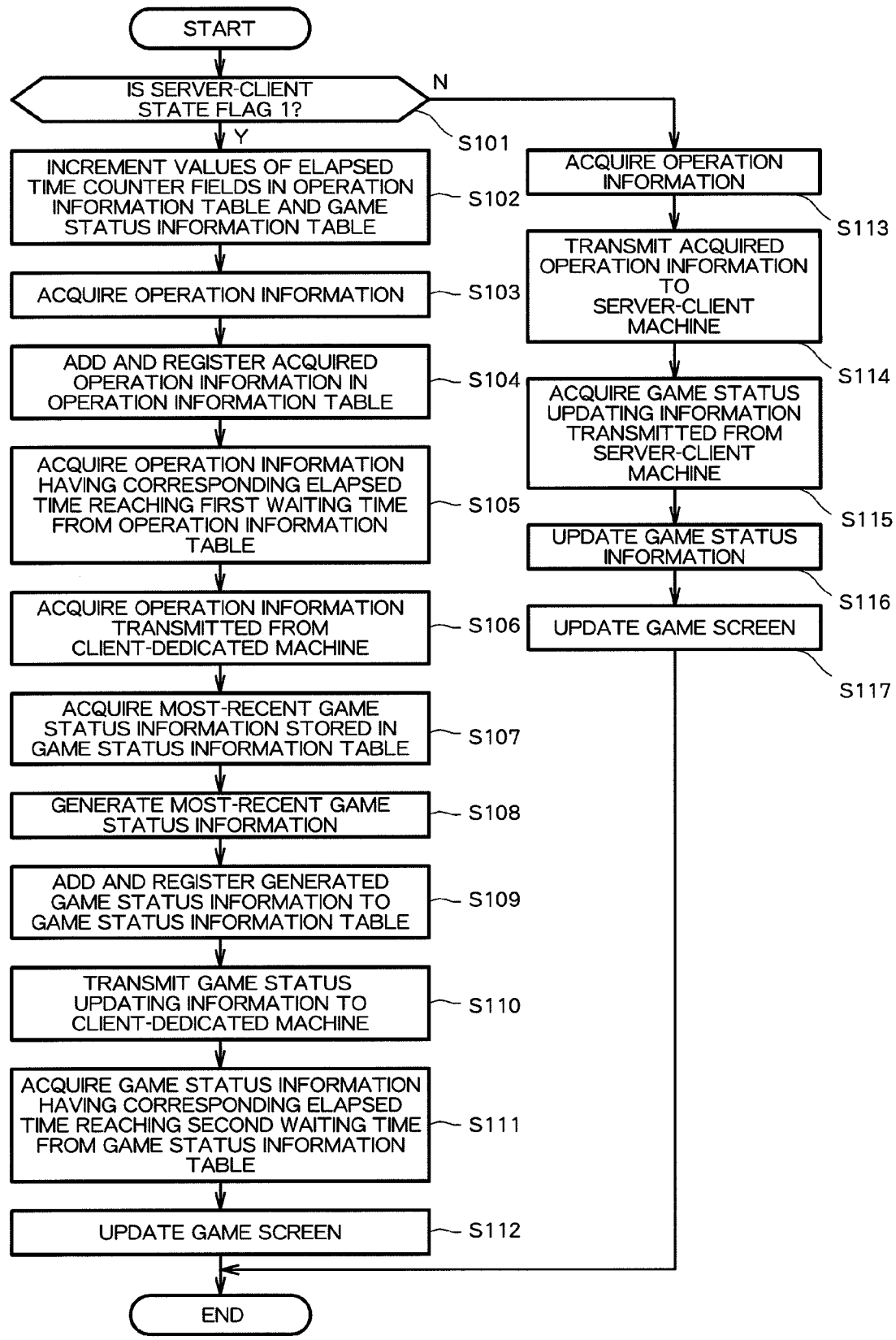
FIG. 7 is a flowchart showing a process executed in a game machine.

Next, a process periodically executed at a predetermined interval (for example, every $1/60^{th}$ of a second) in the game machines 12 in the competition soccer game will be explained. FIG. 7 is a flowchart primarily showing processes, among the executed processes, related to the present invention. This process is realized, for example, by a game program, which is read from an information storage medium such as a DVD-ROM or a game program, which is supplied via the communication network 14, being executed in the game machine 12.

As shown in FIG. 7, in the game machine 12, it is determined whether or not the server-client state flag of the game machine 12 is 1, based on the game machine information table stored in the game machine information storage 20 of the game machine 12 (S101). In the case where the server-client state flag is 1, that is, in the case where the game machine 12 is in the server-client state, a process at the time of server-client state (S102-S112) is executed. In the case where, on the other hand, the server-client state flag is not 1, that is, in the case where the game machine 12 is in the client-dedicated state, a process at a time of client-dedicated state (S113-S117) is executed.

In the process at the time of the server-client state, first, the values of the "elapsed time counter" field in the game status information table (FIG. 5) and the operation information table (FIG. 6) are incremented (S102). Operation information indicating the operation content executed in the game machine 12 is acquired (S103), and added and registered in the operation information table (S104). More specifically, a new record is added to the operation information table, the operation information acquired in S103 is stored in the "operation information" field of the new record, and a value of 0 is stored in the "elapsed time counter" field.

Then, a record having the elapsed time indicated by the content of the "elapsed time counter" field equaling to the first waiting time $\Delta Tw1$ is read from the operation information table, and operation information stored in the "operation information" field of the record is acquired (S105). After the acquisition of the operation information is completed, that record is deleted from the operation information table.

Next, the operation information transmitted from the operation information acquiring unit 34 of the client-dedicated machine is acquired (S106). In addition, the most-recent game status information maintained in the game status information table is acquired (S107). More specifically, a record with the smallest value in the "elapsed time counter" field is read from the game status information table, and game status information stored in the "game status information" field of that record is acquired.

Next, the most-recent game status information is generated based on the operation information acquired in S105 (operation information indicating operation content executed in the server-client machine), the operation information acquired in S106 (operation information indicating the operation content executed in the client-dedicated machine), and the game status information acquired in S107 (S108).

The game status information generated in S108 is added and registered in the game status information table (S109). That is, a new record is added to the game status information table. The game status information generated in S108 is stored in the "game status information" field of the record and a value of 0 is stored in the "elapsed time counter" field. Game status updating information indicating a difference between the game status information generated in S108 and the game status information acquired in S107 is transmitted to the client-dedicated machine (s110).

Then, a record having the elapsed time indicated by the content of the "elapsed time counter" field equaling the second waiting time $\Delta Tw2$ is read from the game status information table, and game status information stored in the "game status information" field of that record is acquired (S111). After the acquisition of the game status information is completed, that record is deleted from the game status information table.

A game screen is then generated on the VRAM based on the game status information acquired in S111 (S112). The game screen generated on the VRAM is displayed on the display unit 38 at a predetermined time.

In the process at the time of client-dedicated state, on the other hand, first, operation information indicating the operation content executed in the game machine 12 is acquired (S113). Then, the acquired operation information is transmitted to the server-client machine (S114).

Then, game status updating information transmitted from the game status information updating unit 42 of the server-client machine is acquired (S115), and a stored content of the game status information storage 30 is updated based on the game status updating information (S116). Then, a game screen is generated on the VRAM based on the game status information stored in the game status information storage 30 (S117). The game screen generated on the VRAM is displayed on the display unit 38 at a predetermined time.

Figure 8:
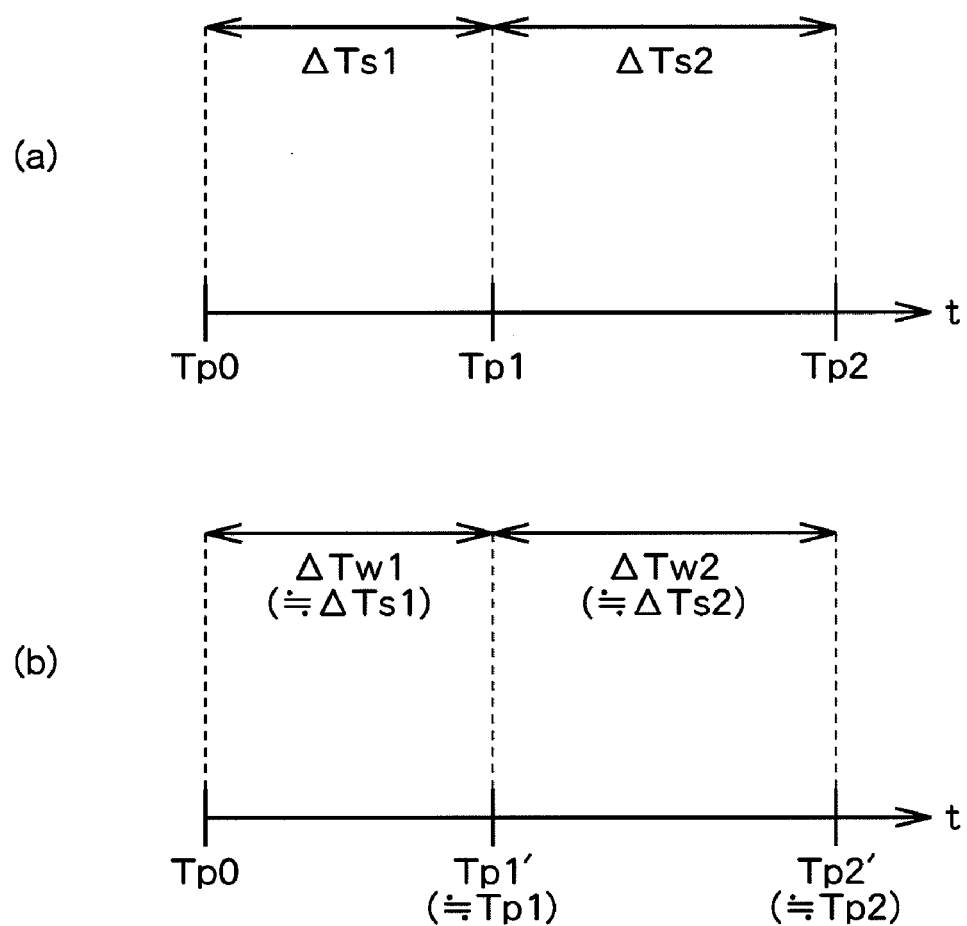
FIG. 8 is a diagram for explaining a time period from a time when an operation is executed in the game machine to a time when the operation is reflected on the game screen.

A time period required from a time when an operation is executed in the game machine 12 to a time when the operation content is reflected in the game screen of the game machine 12 will now be described. FIG. 8(a) is a diagram for explaining a time period required for an operation executed in the client-dedicated machine to be reflected in the game screen of the client-dedicated machine. FIG. 8(b) is a diagram for explaining a time period required for an operation executed in the server-client machine to be reflected in the game screen of the server-client machine.

As described, in the case where an operation of the player is received in the client-dedicated machine, the operation information is supplied to the game status information updating unit 42 of the server-client machine via the communication network 14. If the time required for transmission of the operation information from the client-dedicated machine to the server-client machine is $\Delta Ts1$, in the case where the operation is received in the client-dedicated machine, it can be estimated that the operation information is supplied to the game status information updating unit 42 of the server-client machine at a time (Tp1) when $\Delta Ts1$ has elapsed from the time (Tp0) of receiving of the operation.

In the case where the most-recent game status information is generated in the server-client machine, the game status updating information is transmitted to the client-dedicated machine. At the client-dedicated machine, the game status information is updated and a game screen based on the updated game status information is displayed. If the time required for transmission of the game status updating information from the server-client machine to the client-dedicated machine is $\Delta Ts2$, in the case where the most-recent game status information is generated in the server-client machine, it can be estimated that the game screen based on that game status information is displayed on the monitor of the client-dedicated machine at a time (Tp2) when $\Delta Ts2$ has elapsed from the time (Tp1) of generation of the game status information.

In the case where, on the other hand, the operation of the player is received in the server-client machine, the operation information is supplied to the game status information updating unit 42 of the server-client machine at a time (Tp1') when the first waiting time $\Delta Tw1$ has elapsed from the time (Tp0) of receiving of the operation.

As described, the first waiting time $\Delta Tw1$ is obtained by an equation $\Delta Tw1=Md/Vd$ based on the average data size Md of the operation information and the estimated communication speed Vd in the case where data is transmitted from the client-dedicated machine to the server-client machine. Because of this, it can be estimated that $\Delta Tw1$ and $\Delta Ts1$ are approximately equal to each other. In other words, a configuration is employed in the network game system 10 such that the operation information of the operation received by the game machines 12 (server-client machine and client-dedicated machine) at the same timing (Tp0) are supplied to the game status information updating unit 42 of the server-client machine at approximately the same timings (Tp1 and Tp1').

In the case where the most-recent game status information is generated at the server-client machine, the game status information is supplied to the display controller 36 at a time (Tp2') when the second waiting time ΔTw2 has elapsed from the time (Tp1') of generation of the game status information, and the game screen based on that game status information is displayed on the monitor.

As described, the second waiting time ΔTw2 is obtained from an equation ΔTw2=Mu/Vu based on the average data size Mu of the game status updating information and the estimated communication speed Vu when data is transmitted from the server-client machine to the client-dedicated machine. Because of this, it can be estimated that ΔTw2 and ΔTs2 are approximately equal to each other. In other words, the network game system 10 is configured such that the game screen based on the game status information generated by the game status information updating unit 42 of the server-client machine at a certain time (Tp1 and Tp1') is displayed on the monitors of the server-client machine and the client-dedicated machine at approximately the same time (Tp2 and Tp2').

As described, in the network game system 10, in the case where an operation is executed in the server-client machine, the time period from a time when the operation is executed to a time when the game screen of a content corresponding to the operation is displayed in the server-client machine is controlled based on a sum of the first waiting time ΔTw1 and the second waiting time ΔTw2. As a result, in the network game system 10, the length of a time period for the operation executed in the server-client machine to be reflected in the game screen displayed on the server-client machine is set to be approximately equal to the length of a time period for the operation executed in the client-dedicated machine to be reflected in the game screen displayed on the client-dedicated machine. With the network game system 10, the response with respect to the game operation in the server-client machine and the response with respect to the game operation in the client-dedicated machine can be set approximately equal to each other. In other words, with the network game machine 10, the unfairness between the player playing on the server-client machine and the player playing on the client-dedicated machine can be corrected.

The present invention is not limited to the preferred embodiment as described above.

For example, it is possible to employ a configuration in which measurement by the measurement unit 22 of the server-client machine (game machine 12a in the configuration of FIG. 4) is executed even after the game is started. The measurement result may be supplied to the data exchange time information acquiring unit 44. With such a configuration, even when the communication status in the communication network 14 is changed after the game is started, the unfairness between the player playing on the server-client machine and the player playing on the client-dedicated machine can be corrected.

In this case, the response requesting unit 24 of the server-client machine may transmit response request data having a data size of Mu (average data size of game status updating information). In the case of receipt of the response request data, the response unit 26 of the client-dedicated machine (game machine 12b in the configuration of FIG. 4) may transmit response data having a data size of Md (average data size of the operation information) The measurement unit 22 of the server-client machine may calculate a time ΔT required from transmission of the response request data to the reception of the response data, and supply the time ΔT to the data exchange time information acquiring unit 44. In this case, the data exchange time information acquiring unit 44 may maintain the value of ΔT and supply a value of $\Delta T^*\alpha((0 \leq \alpha \leq 1)$ as the first waiting time ΔTw1 to the operation information acquiring unit 34 and a value of $\Delta T^*(1-\alpha)$ as the second waiting time ΔTw2 to the display controller 36. With this structure also, the response with respect to the game operation in the server-client machine and the response with respect to the game operation in the client-dedicated machine can be set approximately equal to each other.

Alternatively, T1 and T2 measured by the measurement unit 22 of the client-dedicated machine (game machine 12b in the configuration of FIG. 4) may be supplied to the data exchange time information acquiring unit 44 of the server-client machine.

Alternatively, the game status information table (FIG. 5) and the operation information table (FIG. 6) may include a field storing an elapsed time from generation (update) of the game status information and information forming a basis for calculating the elapsed time from acquisition of the operation information, in place of the "elapsed time counter" field. For example, a field may be included which stores a time of generation of the game status information or a time of acquisition of the operation information.

In the above description, the server-client machine determination process is executed prior to the start of the game. Alternatively, the server-client machine determination process may also be executed during the game. With such a configuration, in the case where the communication status of the communication network 14 changes during the game and it becomes more suitable for a game machine 12, other than the game machine 12 operating as the server-client machine at that point, to operate as the server-client machine, the server-client machine may be switched to the other game machine 12. With such a configuration, even when the communication status of the communication network 14 changes during the game, the data can be smoothly exchanged between the server-client machine and the client-dedicated machine, and consequently, the players can preferably enjoy the game.

The application of the present invention is not limited to a network game system 10 which provides a soccer game. The present invention can be applied to other network game systems which provide other sports games and other types of games (such as a fighting game).

The invention claimed is:

1. A network game system comprising a first game machine and a second game machine which are networked and in which the first game machine displays a game screen of a content corresponding to an operation executed in the first game machine and makes the second game machine display a game screen of a content corresponding to an operation executed in the second game machine by exchanging data with the second game machine the second game machine comprises:

a second game status information storage unit that stores second game status information indicating a game status; and an operation information acquiring unit that transmits, to the first game machine, operation information corresponding to an operation content executed in the second game machine, the first game machine comprises:

a first game status information updating unit that receives the operation information transmitted from the second game machine, generates first game status information indicating a most-recent game status based on an operation content executed in the first game machine and the operation information transmitted from the second game machine, and transmits, to the second game machine, game status updating information for updating the second game status information stored in the second game status information storage unit to the first game status information generated by the first game status information updating unit; and a first display controller that causes the game screen to be displayed based on the first game status information generated by the first game status information updating unit, the second game machine comprises:

a second game status information updating unit that receives the game status updating information transmitted from the first game machine, and updates the second game status information stored in the second game status information storage unit based on the game status updating information transmitted from the first game machine; and a second display controller that causes the game screen to be displayed based on the second game status information stored in the second game status information storage unit, the network game system comprises:

a data exchange time information acquiring unit that acquires first data exchange time information related to a time period required for transmission of the operation information from the second game machine to the first game machine to generate a first waiting time, and second data exchange time information related to a time period required for transmission of the game status updating information from the first game machine to the second game machine to generate a second waiting time, wherein the first game status information updating unit generates the first game status information, based on the operation content executed in the first game machine, after the first waiting time has elapsed, and wherein the first display controller causes the game screen to be displayed, based on the first game status information generated by the first game status information updating unit based on the operation content executed in the first game machine, after the second waiting time has elapsed.

2. The network game system according to claim 1, wherein the first game machine comprises:

a response requesting unit that transmits first response request data to the second game machine and transmits second response request data to the second game machine, the second game machine comprises:

a response unit that transmits, in the case of reception of the first response request data, first response data, having a data size which differs from that of the first response request data, to the first game machine, and transmits, in the case of reception of the second response request data, second response data to the first game machine, the first game machine comprises a measurement unit that measures a time period from a time when the first response request data is transmitted to a time when the first response data is received and a time period from a time when the second response request data is transmitted to a time when the second response data is received, and the data exchange time information acquiring unit acquires the first data exchange time information and the second data exchange time information based on a measurement result by the measurement unit.

3. The network game system according to claim 1, wherein the second game machine comprises:

a response requesting unit that transmits first response request data to the first game machine, and transmits second response request data to the first game machine, the first game machine comprises:

a response unit that transmits, in the case of reception of the first response request data, first response data, having a data size which differs from that of the first response request data, to the second game machine, and transmits, in the case of reception of the second response request data, second response data to the second game machine, the second game machine comprises a measurement unit that measures a time period from a time when the first response request data is transmitted to a time when the first response data is received and a time period from a time when the second response request data is transmitted to a time when the second response data is received, and the data exchange time information acquiring unit acquires the first data exchange time information and the second data exchange time information based on a measurement result by the measurement unit.

4. The network game system according to claim 2, wherein a ratio of data size between the first response request data and the first response data differs from a ratio of data size between the second response request data and the second response data.

5. The network game system according to any one of claim 1, wherein the first game status information updating unit controls, based on the first data exchange time information, the length of the time period from a time when the operation is executed in the first game machine to a time when the first game status information based on the operation content is generated by the first game status information updating unit; and the first display controller controls, based on the second data exchange time information, the length of the time period from a time when the first game status information is generated by the first game status information generation means to a time when the game screen based on the first game status information is displayed by the first display controller.

6. A networked game system wherein a game machine which is included as a first game machine in the network game system comprising the first game machine and a second game machine which are networked connected to and in which the first game machine displays a game screen of a content corresponding to an operation executed in the first game machine and makes the second game machine display a game screen of a content corresponding to an operation executed in the second game machine by exchanging data with the second game machine the second game machine comprising:

a second game status information storage unit that stores second game status information indicating a game status; an operation information acquiring unit that transmits, to the first game machine, operation information corresponding to an operation content executed in the second game machine; a second game status information updating unit that receives game status updating information transmitted from the first game machine, and updates the second game status information stored in the second game status information storage unit based on the game status updating information transmitted from the first game machine; and a second display controller that causes the game screen to be displayed based on the second game status information stored in the second game status information storage unit, the game machine comprising: a first game status information updating unit that receives the operation information transmitted from the second game machine, generates first game status information indicating a most-recent game status based on an operation content executed in the first game machine and the operation information transmitted from the second game machine, and transmits, to the second game machine, the game status updating information for updating the second game status information stored in the second game status information storage unit to the first game status information generated by the first game status information updating unit; a first display controller that causes the game screen to be displayed based on the first game status information generated by the first game status information updating unit; and a data exchange time information acquiring unit that acquires first data exchange time information related to a time period required for transmission of the operation information from the second game machine to the first game machine to generate a first waiting time, and second data exchange time information related to a time period required for transmission of the game status updating information from the first game machine to the second game machine to generate a second waiting time, wherein the first game status information updating unit generates the first game status information, based on the operation content executed in the first game machine, after the first waiting time has elapsed; and the first display controller causes the game screen to be displayed, based on the first game status information generated by the first game status information updating unit based on the operation content executed in the first game machine, after the second waiting time has elapsed.

7. A method of controlling a networked game system wherein the game machine included as a first game machine in the network game system comprising the first game machine and a second game machine which are networked connected and in which the first game machine displays a game screen of a content corresponding to an operation executed in the first game machine and makes the second game machine display a game screen of a content corresponding to an operation executed in the second game machine by exchanging data with the second game machine the second game machine comprising: a second game status information storage unit that stores second game status information indicating a game status; an operation information acquiring unit that transmits, to the first game machine, operation information corresponding to an operation content executed in the second game machine; a second game status information updating unit that receives game status updating information transmitted from the first game machine, and updates the second game status information stored in the second game status information storage unit based on the game status updating information transmitted from the first game machine; and a second display controller that causes the game screen to be displayed based on the second game status information stored in the second game status information storage unit, a processor being provided to perform the method comprising: first game status information updating, in which the operation information transmitted from the second game machine is received, first game status information indicating a most-recent game status is generated based on an operation content executed in the first game machine and the operation information transmitted from the second game machine, and the game status updating information for updating the second game status information stored in the second game status information storage unit to the first game status information generated in the first game status information updating is transmitted to the second game machine; first display controlling, in which the game screen is displayed based on the first game status information generated in the first game status information updating; and data exchange time information acquiring, in which first data exchange time information related to a time period required for transmission of the operation information from the second game machine to the first game machine to generate a first waiting time, and second data exchange time information related to a time period required for transmission of the game status updating information from the first game machine to the second game machine to generate a second waiting time are acquired, wherein in the first game status information updating, the first game status information is generated, based on the operation content executed in the first game machine, after the first waiting time has elapsed; and in the first display controlling, the game screen is displayed, based on the first game status information generated in the first game status information updating based on the operation content executed in the first game machine, after the second waiting time has elapsed.

8. A non-transitory computer readable information storage medium storing a program for causing a networked game system computer to function as a first game machine included in a network game system comprising the first game machine and a second game machine which are networked connected and in which the first game machine displays a game screen of a content corresponding to an operation executed in the first game machine and makes the second game machine display a game screen of a content corresponding to an operation executed in the second game machine by exchanging data with the second game machine the second game machine comprising: a second game status information storage unit that stores second game status information indicating a game status; an operation information acquiring unit that transmits, to the first game machine, operation information corresponding to an operation content executed in the second game machine; a second game status information updating unit that receives game status updating information transmitted from the first game machine, and updates the second game status information stored in the second game status information storage unit based on the game status updating information transmitted from the first game machine; and a second display controller that causes the game screen to be displayed based on the second game status information stored in the second game status information storage unit, the program causing the computer to function as: a first game status information updating unit that receives the operation information transmitted from the second game machine, generates first game status information indicating a most-recent game status based on an operation content executed in the first game machine and the operation information transmitted from the second game machine, and transmits, to the second game machine, the game status updating information for updating the second game status information stored in the second game status information storage unit to the first game status information generated by the first game status information updating unit; a first display controller that causes the game screen to be displayed based on the first game status information generated by the first game status information updating unit; and a data exchange time information acquiring unit that acquires first data exchange time information related to a time period required for transmission of the operation information from the second game machine to the first game machine to generate a first waiting time, and second data exchange time information related to a time period required for transmission of the game status updating information from the first game machine to the second game machine to generate a second waiting time, wherein the first game status information updating unit generates the first game status information, based on the operation content executed in the first game machine, after the first waiting time has elapsed; and the first display controller causes the game screen to be displayed, based on the first game status information generated by the first game status information updating unit based on the operation content executed in the first game machine, after the second waiting time has elapsed.

* * * * *